(12) United States Patent
Parantainen et al.

(10) Patent No.: US 6,246,881 B1
(45) Date of Patent: Jun. 12, 2001

(54) METHOD OF CHANNEL ALLOCATION

(75) Inventors: Janne Parantainen; Oscar Salonaho, both of Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/362,075

(22) Filed: Jul. 27, 1999

Related U.S. Application Data

(63) Continuation of application No. PCT/FI98/00132, filed on Feb. 13, 1998.

(30) Foreign Application Priority Data

Feb. 14, 1997 (FI) ........................................................ 970639

(51) Int. Cl.[7] .................................................. H04Q 7/28
(52) U.S. Cl. ............................................ 455/450; 455/452
(58) Field of Search ................................... 455/440, 444, 455/447, 448, 450, 452, 509, 62, 63, 13.4, 427, 501, 67.3, 451, 65, 512, 522; 370/347, 442

(56) References Cited

U.S. PATENT DOCUMENTS

| 5,428,815 | | 6/1995 | Grube . | |
| 5,448,750 | | 9/1995 | Eriksson et al. . | |
| 5,448,754 | * | 9/1995 | Ho et al. ................................ | 455/454 |
| 5,666,654 | | 9/1997 | Kanai . | |
| 5,666,655 | * | 9/1997 | Ishikawa et al. ...................... | 455/512 |
| 5,752,192 | * | 5/1998 | Hamabe ................................. | 455/450 |
| 5,828,948 | * | 10/1998 | Almgren et al. ...................... | 455/450 |
| 5,854,981 | * | 12/1998 | Wallstedt et al. ..................... | 455/439 |
| 5,857,143 | * | 1/1999 | Kataoka ................................. | 455/62 |
| 5,884,145 | * | 3/1999 | Haartsen .................................. | 455/63 |
| 5,930,248 | * | 7/1999 | Langlet et al. ........................ | 370/347 |
| 5,956,642 | * | 9/1999 | Larsson et al. ........................ | 455/449 |

FOREIGN PATENT DOCUMENTS

WO 97/12489   4/1997   (WO) .

OTHER PUBLICATIONS

May 1997, IEEE, 47th Vehicular Technology Conference, Phoenix, Arizona, May 4–7, 1997. p. 1287, Col. 2, line 30—p. 1288 Col. 1, line 10.
Aug. 12, 1988, International Search Report for PCT/FI98/00132.

* cited by examiner

*Primary Examiner*—Tracy Legree
*Assistant Examiner*—Jean A Gelin
(74) *Attorney, Agent, or Firm*—Altera Law Group, LLC

(57) ABSTRACT

When a dynamic channel allocation method based on monitoring of signal levels is used for channel allocation, the results of signal level measurements must be averaged in order to achieve a sufficient reliability. Averaging causes a delay in measurement results, for which reason such a channel may be allocated the interference level of which has just changed e.g. because another connection has been set up which functions nearby on the same channel. According to the invention, allocation of a channel causing excessive interference with a connection already set up is limited.

21 Claims, 9 Drawing Sheets

|    | TS1     | TS2     | TS3 | TS4     | TS5     | TS6 | TS7     | TS8 |
|----|---------|---------|-----|---------|---------|-----|---------|-----|
| F1 | 12.58.10|         |     |         |         |     |         |     |
| F2 |         |         |     |         | 12.58.10|     |         |     |
| F3 |         | 12.58.12|     |         |         |     | 12.58.11|     |
| F4 |         |         |     | 12.58.14|         |     |         |     |
| F5 |         |         |     |         |         | 12.58.13|     |     |

CHANNEL K

FIG. 8.

|    | TS1 | TS2     | TS3     | TS4     | TS5     | TS6     | TS7     | TS8 |
|----|-----|---------|---------|---------|---------|---------|---------|-----|
| F1 |     |         | 12.58.14|         |         |         |         |     |
| F2 |     |         |         |         | 12.58.10|         |         |     |
| F3 |     | 12.58.12|         |         |         |         | 12.58.11|     |
| F4 |     |         |         | 12.58.14|         |         |         |     |
| F5 |     |         |         |         |         | 12.58.11|         |     |

CHANNEL K

FIG. 9A.

|    | TS1 | TS2     | TS3     | TS4     | TS5     | TS6     | TS7     | TS8 |
|----|-----|---------|---------|---------|---------|---------|---------|-----|
| F1 |     |         | 12.58.14|         |         |         |         |     |
| F2 |     |         | 12.58.15|         |         |         |         |     |
| F3 |     | 12.58.12|         |         |         |         | 12.58.11|     |
| F4 |     |         |         | 12.58.14|         |         |         |     |
| F5 |     |         |         |         |         | 12.58.11|         |     |

CHANNEL K          CHANNEL I

FIG. 9B.

METHOD OF CHANNEL ALLOCATION

This application is a continuation of PCT/FI98/00132 filed Feb. 13, 1998.

FIELD OF THE INVENTION

This invention concerns a method of dynamic channel allocation in a mobile communications system.

BACKGROUND OF THE INVENTION

The main structural elements of a known mobile communications system are shown in FIG. 1. The figure shows a mobile services switching centre (MSC), a base station controller (BSC), a base transceiver station (BTS), a mobile station (MS) and a network management system (NMS). The network also typically comprises several interconnected mobile services switching centres (MSC), of which only one is shown in the figure for the sake of clarity. The mobile station system is connected to a fixed telephone network, e.g. a public switched telephone network (PSTN), or an integrated services digital network (ISDN), through a mobile services switching centre MSC. Typically, several base station controllers BSC hierarchically under the MSC are connected to each mobile services switching centre MSC. Several base transceiver stations BTS hierarchically under the BSC are typically connected to each base station controller BSC. The base transceiver stations can set up connections with the mobile stations MS by way of channels through a so-called air interface. For the sake of simplicity, the figure shows only one base station controller BSC, one base transceiver station BTS and one mobile station MS. The network management system NMS may be used for controlling the operation of network elements, and e.g. for changing the network configuration.

The air interface between base transceiver stations and mobile stations can be divided into channels in several different ways. Known methods are at least TDM (Time Division Multiplexing), FDM (Frequency Division Multiplexing) and CDM (Code Division Multiplexing). The band available in TDM systems is divided into successive time slots. A certain number of successive time slots forms a periodically repeating time frame. The channel is defined by the time slot available in the time frame. In FDM systems, the channel is defined by the available frequency, while in CDM systems it is defined by the spread code to be used. Combinations of the methods of division mentioned above are also used. E.g. the known GSM system uses FDM/TDM division, whereby frequency and time slot determine the channel.

To obtain sufficient capacity in the limited frequency band of the mobile communications system, the channels in use must be used several times. For this reason, the coverage area of the system is divided into cells. Each cell has its own geographical area or cell area. Each cell has a base transceiver station serving the mobile stations located within the cell area. If channels having the same frequency are reused in cells located too close to each other, the connections using these channels will begin interfering with one another. The channel is caused interference not only by reuse of the own channel but also by adjacent channels used nearby, because adjacent channels are always slightly overlapping to save the frequency band. To maximise the capacity the channels must be reused in cells as close to one another as possible, however, so that the carrier to interference ratio CIR will allow an adequate connection quality. The distance at which the same channel may be reused so that the CIR remains acceptable is called the interference distance, while the distance at which the same channel is reused is called the reuse distance. Since the CIR is a function of reuse distance and transmission power, the carrier to interference ratio may be reduced in a cellular system so as to improve the quality of the connection by increasing the distance between base transceiver stations or by using dynamic control of the transmission power.

In channel allocation the objective is to allocate channels for desired connections, which channels may all be used at the same time while the quality of signals remains acceptable. Methods of channel allocation are at least FCA (Fixed Channel Allocation), DCA (Dynamic Channel Allocation) and HCA (Hybrid Channel Allocation) obtained as a combination of these. The various methods are described quite thoroughly in a publication by I. Katzela, M. Naghshineh: "Channel Assignment Schemes for Cellular Mobile Telecommunication Systems: A Comprehensive Survey", IEE Personal Communications, June 1996.

In fixed channel allocation, a set of channels is assigned for each cell according to some reuse scheme. Typically, the channels are reused in every $9^{th}$ or in every $12^{th}$ cell. Simplicity is an advantage of this method, but it suffers from an inability to adapt to traffic situations and to changes in the number of mobile subscribers in the cells. In addition, to obtain a good result the method necessarily requires frequency planning based on signal drop-outs which are difficult to predict.

In dynamic channel allocation, all channels are in a joint "channel pool". Channels are taken dynamically from the pool for use in the cell for new calls or for channel exchanges in the cell as calls arrive in the system. It is ensured at the same time that a minimum CIR ratio is preserved. Thus there is no fixed relation between channels and cells, but any channel can be selected by any cell, provided that the carrier to interference ratio is acceptably low. Advantages of this method are great flexibility and an ability to adapt to changing traffic, but on the other hand it is more inefficient than fixed channel allocation, if the load is very high.

In hybrid channel allocation, the available channels are divided into fixed and dynamic channels, of which the fixed channels are assigned FCA typically for use by certain cells while the dynamic channels are assigned DCA typically for use by all users. The cells always attempt primarily to use their fixed frequencies.

The dynamic channel allocation methods may be divided into those based on measurements of channel carrier to interference ratios and those based on knowledge of the allocation situation.

In the methods based on knowledge of the allocation situation, the carrier to interference ratios caused by operating connections are estimated and such areas around base transceiver stations are defined within which reuse of a channel in use at the base transceiver station or use of channels adjacent to the channel would cause excessive interference. Allocation of the concerned channels is prevented in these areas.

Dynamic channel allocation methods based on measurements of channel carrier to interference ratios define the strength of the channel candidate's existing interfering signal. If the concerned channel were made available to the connection to be set up, this signal existing on the channel would cause interference to the connection. The channel carrier to interference ratio is thus defined by measuring, whereby direct information is obtained about the carrier to interference ratio to be optimised. As the carrier to interference ratio may vary even strongly e.g. due to DTX (Discontinuous Transmission), the signal measurements used for defining the carrier to interference ratio must be averaged to obtain sufficient reliability in practice.

Channel allocation is studied as an example in the situation shown in FIG. 2, where two mobile stations MSA and MSB request a channel of nearby base transceiver stations BTSA and BTSB. A channel is requested first by MSA and then a little later by MSB. The figure shows base transceiver stations and cells formed around these. The cells depict an area where mobile stations seek connection with the base transceiver station of the cell.

In the example, the channel allocation method is embodied in base transceiver stations BTS. The channel allocation algorithm used as an example is the MCIR (Maximum Signal to Noise Interference Ratio) method, which is a subclass of the dynamic channel allocation methods based on signal level measurement. In this method such channels are sought on which as good a signal to noise ratio as possible is achieved in the up-link direction from mobile station to base transceiver station. A method of this type can be used directly e.g. in an existing GSM system where mobile stations do not perform measurements of the carrier to interference ratio of channel candidates.

Channel allocation for mobile station MSA is studied first. Mobile station MSA receives an instruction from its user to set up a call connection. The mobile station requests a channel of the network for setting up the said connection by sending a channel request message to base transceiver station BTSA which receives the request.

Base transceiver station BTSA receives the channel request of the mobile station and begins performing the channel allocation method shown in FIG. 3. The base transceiver station constantly monitors the signal levels of all busy channels in the up-link direction (point 311). Based on the monitoring measurements, the channels are placed in an order of best to worst, according to a certain norm (point 312). Since signal levels may vary even strongly as a function of time, e.g. due to discontinuous transmission DTX used by mobile stations, the measurement results must always be averaged. As a norm of channel carrier to interference ratio the case shown as an example uses a five-second moving average of signal level measurements performed on the channel.

Having received the channel request, point 302, the base transceiver station BTSA picks up that channel from the list of channels received by it at point 312 on which, according to performed measurements, the best possible CIR will be achieved, point 303. This channel is allocated for use by the connection to be set up (point 304).

FIGS. 4 and 5 show how introduction of the channel allocated for MSA will affect the carrier to interference ratio of channel K at base transceiver station BTSB. FIG. 4 shows interfering signals on channel K of base transceiver station BTSB as a function of time. According to FIG. 4, there is hereby only one cause of interference, interference 1, in the signal measured by the base transceiver station on channel K. The connection started at moment T=12:58:10 in FIG. 4 between base transceiver station BTSA and mobile station MSA begins causing a new interference to channel K (interference 2).

The total interference on channel K of base transceiver station BTSB is shown as a function of time in FIG. 5. Besides, FIG. 5 shows a one-second moving average of total interference 5 which the base transceiver station uses for determining the CIR value of the channel. Before channel K is put into use for the connection between mobile station MSA and base transceiver station BTSA, channel K obtains the best CIR value also at base transceiver station BTSB.

Allocation of a channel for the connection between mobile station MSB and base transceiver station BTSB is studied next. As before, this channel allocation decision is also based on a measurement of the channel carrier to interference ratio.

For an incoming call, MSB requests a channel of base transceiver station BTSB, which is located near base transceiver station BTSA. Base transceiver station BTSB receives the channel request (FIG. 3, point 302) and begins at moment 12:58:11 looking at point 311 for a channel for the connection to be set up based on the channel carrier to interference ratios it has measured. After reception of the channel request (FIG. 3, point 302), the channel (point 303) which is best according to CIR values is picked up from the list of channels arranged according to five-second averages of CIR values formed at point 312. Even though the carrier to interference ratio of channel K has risen in reality due to the introduction of the channel at base transceiver station BTSA, the risen carrier to interference ratio is not yet seen in the values used by the channel allocation algorithm of base transceiver station BTSB due to the delay in averaging. Under these circumstances, the algorithm will allocate channel K also for the connection between base transceiver station BTSB and mobile station MSB. Since the same channel is now used in two connections which are geographically close to one another, the quality of the connection is poor in connections both between MSA and BTSA and between MSB and BTSB.

Based on the above, it is easy to understand that there are problems due to averaging of measurement results in DCA methods based on measurements of channel carrier to interference ratios. When a channel is allocated between a base transceiver station and a mobile station and a call connection is started on the channel, the system's carrier to interference ratio will increase near the base transceiver station on this channel and on its adjacent channels. However, due to averaging of interference measurement results, the increase in carrier to interference ratio is not noticed at once, but only after a certain delay in averaging. The risk thus exists that during the said delay a channel will be allocated for use by some other connection so that the first connection and the second connection will interfere excessively with one another. It is hereby probable that at least the channel of one connection must be exchanged, which will result in signalling loading the network. In the worst case the connection may even be cut off.

Brief summary of the invention The present invention aims at eliminating or reducing the state-of-the-art problems presented above. This objective is achieved by a method which is defined in the independent claims.

The inventive idea is, based on limitation information which changes as time passes, to limit allocation of those channels the introduction of which would cause mutual interference with connections already set up. The limiting information is maintained separately for each base transceiver station and information is collected to it on the channel allocation situation near the base transceiver station. Based on the limiting information, channel allocation is limited during the time when measurement results obtained from interference measurements are incorrect due to delays in measurements and averaging. Channel allocation may be limited e.g. by preventing it altogether or by limiting the maximum power made available to the connection or the number of time slots to be used on the channel. In this way one avoids allocating such a channel for use by a connection to be set up which still seems free of interference due to an averaging delay but the carrier to interference ratio of which has already risen in reality.

In a preferred embodiment of the invention the time of limitation of allocation is essentially equal to the time of interference measurement averaging. Hereby the method will at once resume the channel allocation procedure based on state-of-the-art signal level measurement when it is certain that the carrier to interference ratio is no longer considered too low due to a delay in the averaging of measurement results.

BRIEF DESCRIPTION OF THE DRAWINGS

The invention will be described in greater detail referring by way of example to the appended drawings wherein

FIG. 8 shows the limitation register of a base transceiver station;

FIGS. 9a and 9b show limitation registers of different base transceiver stations;

DETAILED DESCRIPTION OF THE INVENTION

In dynamic channel allocation methods based on measurement of the channel's carrier to interference ratio it is a basic principle that an estimate of the carrier to interference ratio CIR to be achieved with the channel candidate is obtained directly by examining the channel's interfering signal level. Besides state-of-the-art measurements of the carrier to interference ratio for defining the best channel for the desired connection, the present invention uses limitation information which changes as time passes and which is used for limiting the allocation of channels. Various methods of limitation are e.g. total ban on channel allocation, limitation of the maximum transmission power available to the connection and/or limitation of the maximum number of time slots available on the channel to be allocated. The maximum number of time slots available on the channel is limited by allowing use of the channel's time slot in some frames only, e.g. in every third time frame only.

By banning channel allocation any causing of interference is prevented altogether. By limiting the transmission power or the number of available time slots other base transceiver stations are given the chance to use channels causing limited interference to the already allocated connection so that the quality of the connection will not suffer excessively. It is possible to set up a new connection on a channel where the transmission power is limited e.g. to one-fifth of the normal e.g. when a mobile station using an already allocated channel is close to the base transceiver station and it hereby obtains a good carrier to interference ratio CIR even at a lower transmission power. If e.g. one-third of the transfer capacity normally provided by the channel will be sufficient for the new connection, a connection may be set up on a channel where the use of time slots is limited. The connection set up will hereby interfere with every third time frame only. Channel coding methods in general use tolerate such interference relatively well.

Figure 6:
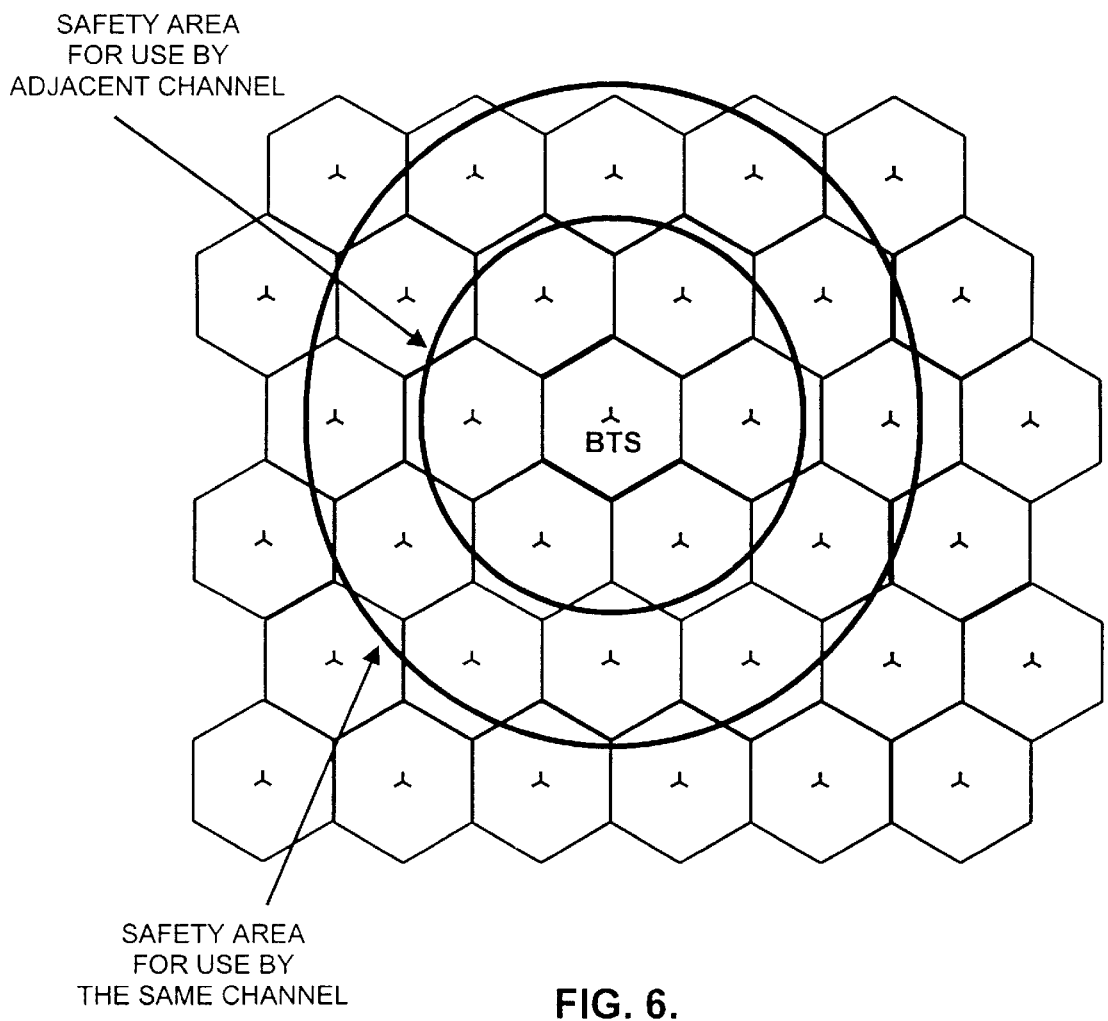
FIG. 6 shows the safety area structure of a base transceiver station.

The use of a channel causes interference only within a geographically limited area. It is thus not sensible to limit channel allocation in the entire remaining network, but limitations must be focused on those base transceiver stations from which channels may cause significant interference when in use. This set of base transceiver stations will hereinafter be called the safety area of the base transceiver station and it is shown in FIG. 6. The figure shows a base transceiver station BTS1 and adjacent base transceiver stations with their cells. The figure also shows safety areas of the base transceiver station BTS1 with the base transceiver station for use by the same channel and an adjacent channel. It is sensible to form various safety areas for use by the same channel and adjacent channels, because the interference distances of the same channel and adjacent channels are different. On the other hand, since a use of several different safety areas will make the system more complex, the same safety areas may also be defined for use by the same channel and an adjacent channel. Safety areas may be defined e.g. administratively through the network management system NMS. Correspondingly, a safety area may be defined by adaptively analysing information obtained by monitoring the operation of the network, e.g. as a set of those base transceiver stations from which interference results.

Figure 3:
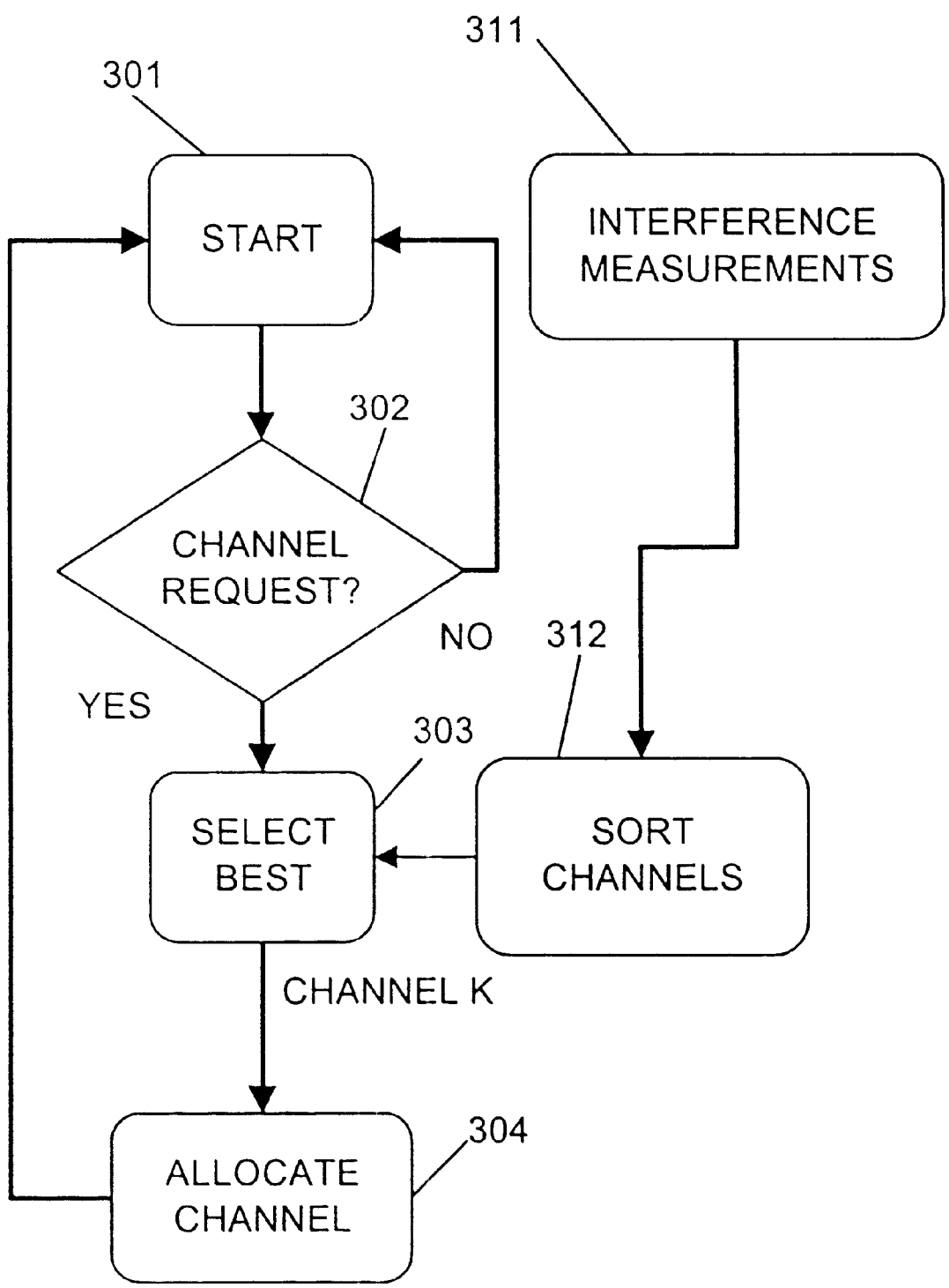
FIG. 3 shows a state-of-the-art algorithm used for channel allocation.
Figure 7:
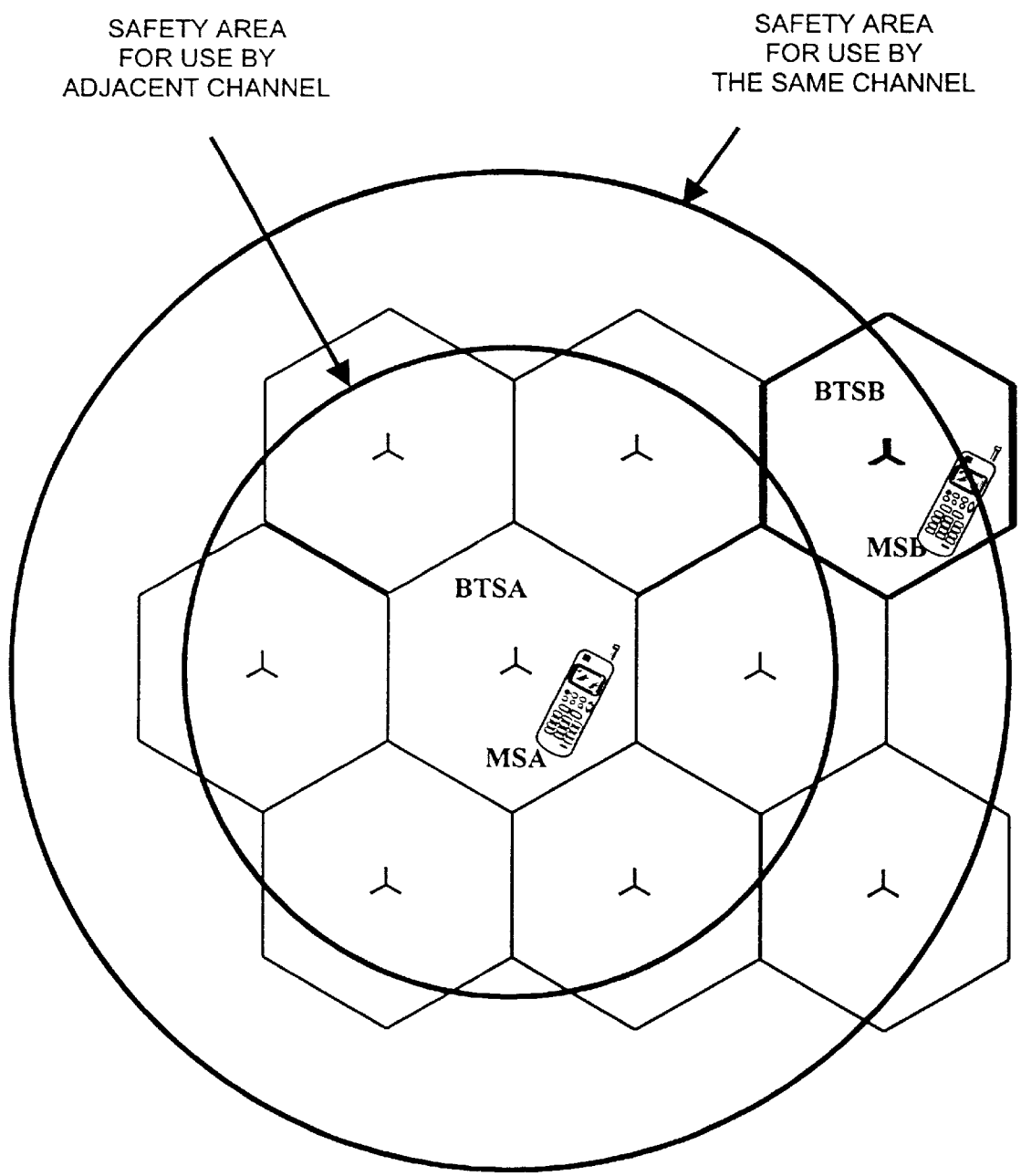
FIG. 7 shows a situation where two mobile stations are requesting a channel of adjacent base transceiver stations and the safety area formed around one base transceiver station.

The operation of the invention will be examined in the following with the aid of the situation presented above, which is given as an example in accordance with FIG. 3. FIG. 7 shows the situation in FIG. 3 and safety areas formed around a base transceiver station BTSA for use by the same channel and an adjacent channel.

In the example, channel allocation is limited by preventing allocation entirely during a predetermined safety period after allocation of a channel. The safety period chosen here as an example is 5 s, the delay in averaging of measurement results. Limitation information is maintained in limitation registers for individual base transceiver stations as shown in FIGS. 8, 9a and 9b. In the register, frequencies are shown on the vertical axis while time slots are shown on the horizontal axis. The times at which the temporary ban on allocation will end are entered in the element corresponding to the frequency and time slot of the channel. If the channel has no valid limitation of allocation, the element corresponding to the channel is void. Registers are dependent on time. FIGS. 9a and 9b show the limitation register of base transceiver station BTSB at two different moments.

Figure 10:
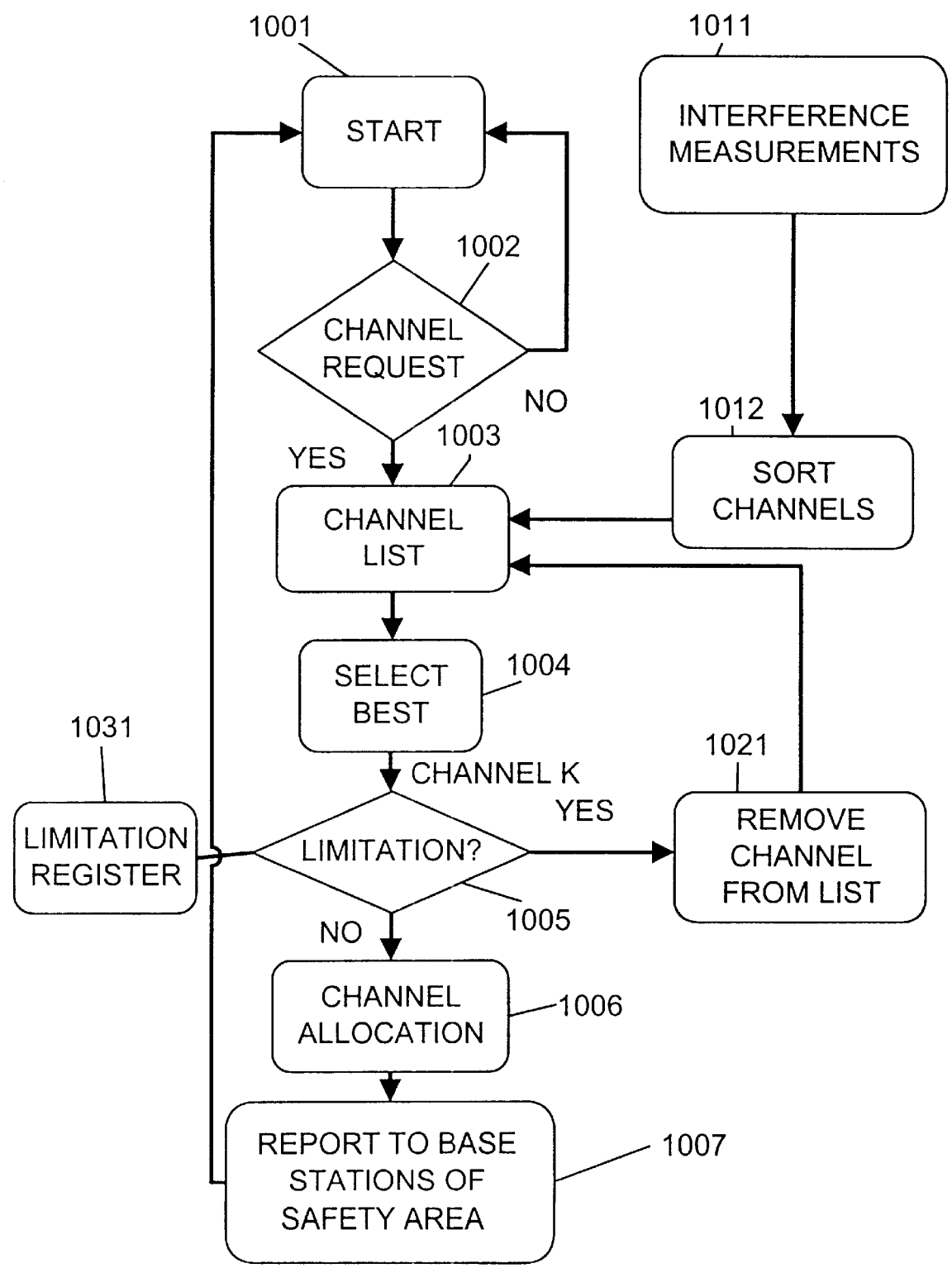
FIG. 10 shows the flow chart of an algorithm implementing the channel allocation method according to the invention.

Mobile station MSA receives an instruction from its user to set up a call connection. The mobile station requests a channel of the network for setting up the said connection by sending a channel request message to base transceiver station BTSA. The base transceiver station receives the mobile station's channel request at moment T=12.58.09 in FIGS. 4 and 5 and begins carrying out its channel allocation method according to the invention as shown in FIG. 10. Having received the channel request, point 1002, it forms a list of channel candidates received from point 1012 and placed in an order of best to worst, point 1003. The channels are placed in an order from best to worst using as a norm a five-second moving average of measurement results received from point 1011. Next, that channel is picked up from the list in the algorithm with which according to performed measurements the best possible CIR will be achieved (point 1004). In this case, this channel is channel k. At this stage in the algorithm a check is made according to the invention at point 1005 of whether allocation of the channel is limited.

FIG. 8 shows the contents of the limitation register of base transceiver station BTSA at the moment when the check at point 1004 in FIG. 10 is made. It is found that the element of channel k, which is a channel (F2, TS3) operating in time slot TS3 of frequency F2, is void, so allocation is not limited. The algorithm of FIG. 10 thus proceeds to point 1006, where the channel is allocated for the connection between base transceiver station BTSA and mobile station MSA (point 1006), and it reports on the allocation it has performed to the base transceiver stations of its safety area (point 1007) at moment 12:58:10 in FIGS. 4 and 5.

Figure 11:
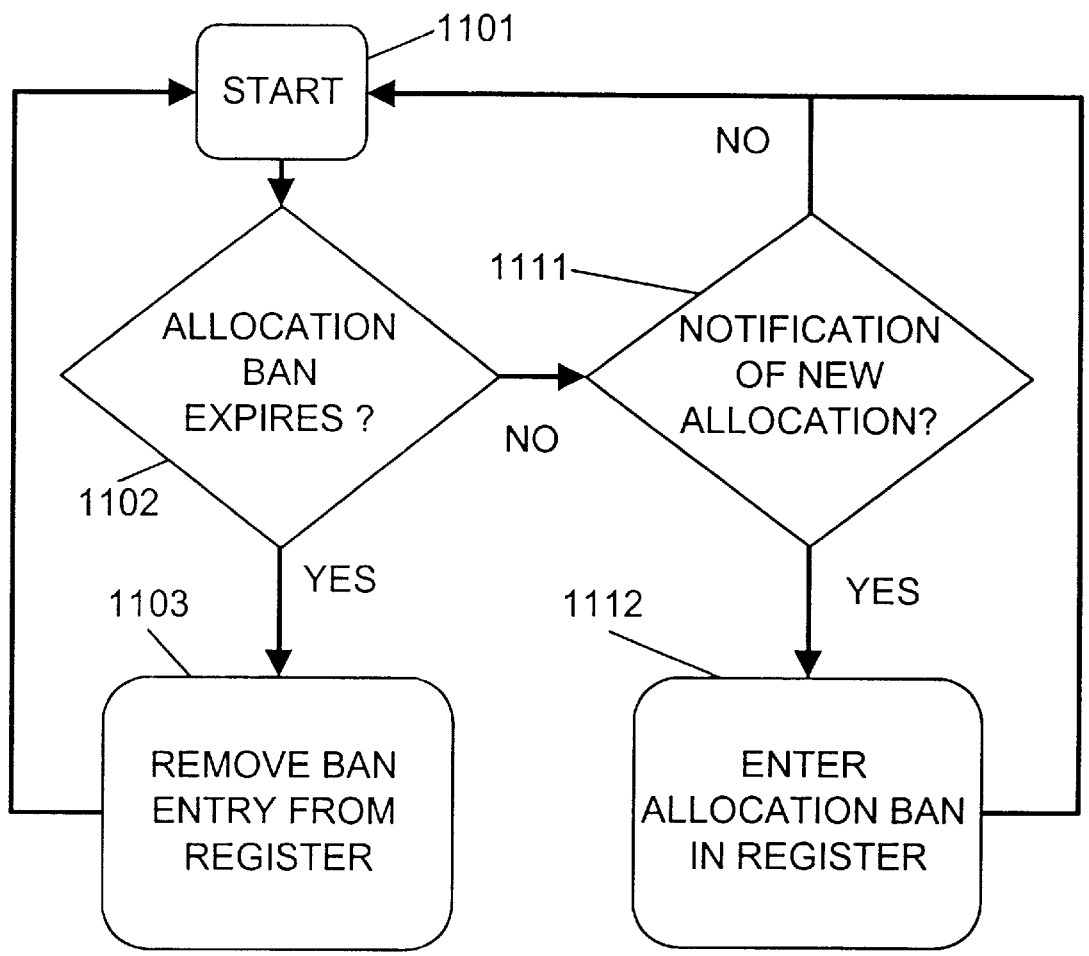
FIG. 11 shows a possible algorithm maintaining a time register.

In response to the report, the base transceiver stations in FIG. 7 will prevent allocation of both channel K and its adjacent channels to adjacent base transceiver stations of BTSA and allocation of channel K only to their neighbours, e.g. to base transceiver station BTSB. Limitation registers for the individual base transceiver stations containing channel-based limitation information according to the invention are maintained constantly. FIG. 11 shows an example of a channel-based maintenance algorithm of a limitation register for the individual base transceiver station. Maintenance of the limitation register includes constant monitoring of whether reports are received for some other base transceiver station to whose safety area the base transceiver station belongs, and monitoring of performed channel allocations (1111) or whether some allocation limitation is expiring (1102). When receiving a report on performed channel allocation, the base transceiver station will at point 1112 of the algorithm ban allocation of the said channel which has been allocated to another base transceiver station. This takes place by entering the limitation expiry time in that element of the limitation register according to FIGS. 8, 9a and 9b which corresponds to the channel. If the base transceiver station also belongs to the safety area of adjacent channels, allocation of channels adjacent to the allocated channel is prevented in the same manner by entering the limitation expiry time for these channels. Upon expiry of the allocation ban the limitation register element corresponding to the channel is emptied at point 1103.

Figure 4:
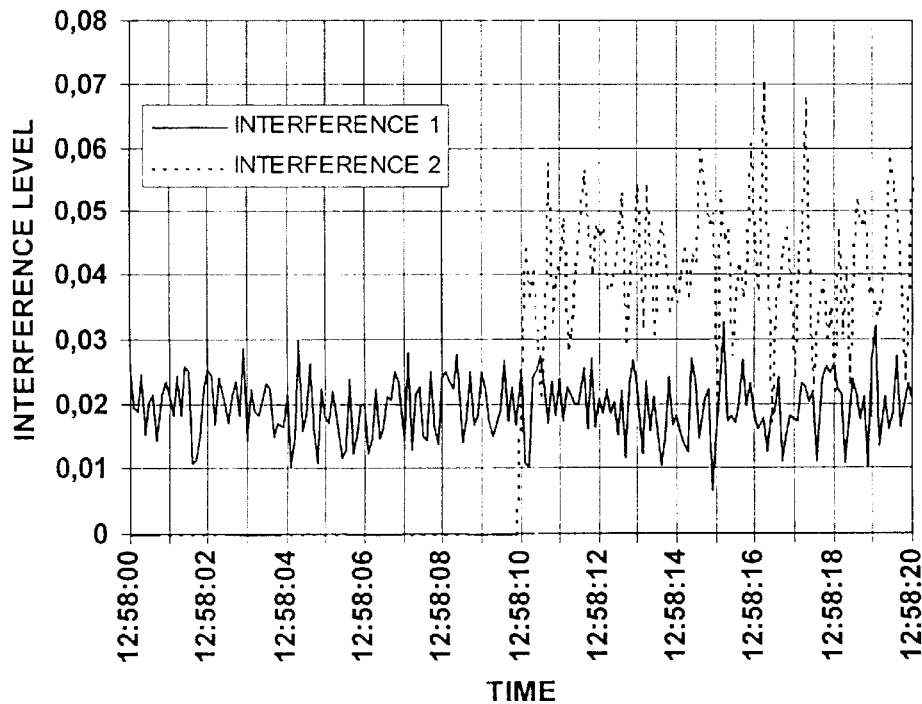
FIG. 4 shows two signals causing interference to the channel as a function of time.
Figure 5:
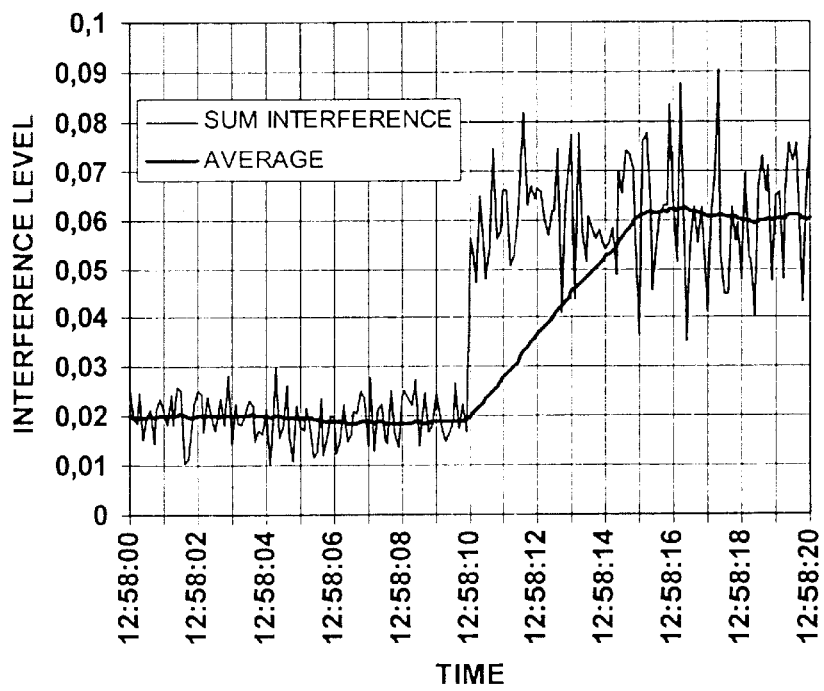
FIG. 5 shows the total interference signal on a channel and its moving average as a function of time.

Upon receiving at moment T=12.58.10 of FIGS. 4 and 5 a report on allocation of channel K to base transceiver station BTSA, base transceiver station BTSB will convert its limitation register according to FIG. 9a by banning allocation of channel K until moment T=12.58.15. Since BTSB does not belong to the safety area of adjacent channels of BTSA which is shown in FIG. 7, the allocation report will not cause any limitation of allocation of channels adjacent to channel K (F1, TS3) and (F3, TS3). At the same time, the ban on allocation of the channel (F2, TS5) expires at base transceiver station BTSB. The limitation register of BTSB will then be as shown in FIG. 9b.

Allocation of a channel for a mobile station MSB will be examined next. MSB requests a channel of base transceiver station BTSB at moment T=12:58:11 in FIGS. 4 and 5. As was described above, the carrier to interference ratio of channel K has already risen by this time, but due to the averaging delay the increase in carrier to interference ratio is not yet seen in the averages of five-second interference measurements which are used in the selection of a channel. The limitation register of base transceiver station BTSB is as shown in FIG. 9b.

BTSB uses the same channel allocation method according to the invention as BTSA for channel allocation. Upon reception of the channel request (FIG. 10, point 1002), a list of channels is formed of the channels available from point 1012 which have been arranged according to five-second moving averages of interference measurements at point 1011, point 1003. Even though the carrier to interference ratio of channel K has already risen in reality according to FIG. 5 due to the introduction of a channel at base transceiver station BTSA, the risen carrier to interference ratio can not yet be seen in the values used by the channel allocation algorithm of base transceiver station BTSB. Since the 5-second average of interference measurements which is used as the carrier to interference ratio norm is at its lowest on channel K, the algorithm will at this stage interpret channel K as the best candidate. The channel having the best CIR value is then (point 1004) picked up from the list of channels.

In arrangements according to the state of the art channel K would be allocated for use by the connection between base transceiver station BTSB and mobile station MSB, which would result in a poor quality of the connection. However, according to the invention base transceiver station BTSB does not allocate channel k directly, but it will first check its limitation register shown in FIG. 9b to find out whether allocation of the concerned channel is banned, point 1005 in FIG. 10. On finding a ban on allocation of the channel, the base transceiver station will remove channel K from its list (1021) and will select the next-best channel I based on CIR measurements. Having found out from its limitation register shown in FIG. 9b that allocation of channel I is not banned (point 1005), the base transceiver station will allocate it for use by the connection between itself and mobile station MSB (point 1006) and it will report to the base transceiver stations within its safety area on the allocation of channel I which it has performed (point 1007). These base transceiver stations receive the report (FIG. 11, point 1111) and enter a temporary allocation ban on the channel (FIG. 11, point 1112), each one in its own limitation register.

The allocation ban on channel K expires at moment T=12.58.15 in FIGS. 4 and 5. The averaged measurements of the signal levels of channel K have hereby caught up with the step response caused to the interference by introduction of the channel, as can be seen in FIG. 5. Upon expiry of the ban, all base transceiver stations within the safety area of base transceiver station BTSA will find that the time for expiry of the ban at channel K in the limitation registers is expiring (FIG. 11, point 1102). If allocation of the same channel is again banned later in some base transceiver station, the ban in the concerned base transceiver station will of course not yet end at the same time with bans of other base transceiver stations. In response to the expiry, the ban entry (point 1103) is removed from the limitation registers of the base transceiver stations. The procedure is the same when the ban on allocation of channel I expires in the safety area of base transceiver station BTSB.

The procedure for maintaining limitation information and for implementation of the limitation is not essential for the invention. If implementation is done as a time register, then implementation of the register need not necessarily be as shown in the example. An alternative procedure is e.g. to proceed so that when checking the time register at condition point 1005 of the channel allocation algorithm, the allocation limitation is not taken into account, if the limitation expiry time entered in the register is already in the past. The limitation register may also be implemented e.g. as time counters counting downwards. The safety time may be defined e.g. as a standard for the individual base transceiver station or it may always be signalled in connection with the message reporting on performed allocation, whereby the safety time may also be specific to the mobile station.

As was mentioned above, the limitation of channel allocation according to the invention is not necessarily the ban on channel allocation for a certain period of time which was used in the above example for the sake of simplicity. The limitation may also be e.g. adjustment of the transmission power used on the channel or of the number of time slots used on the channel. When adjusting the transmission power, channel allocation is not prevented, but the upper limits of the transmission power used in the new connection in up-link and down-link directions are adjusted downwards. This may be done e.g. by setting a suitable maximum power allowed by the power control algorithm. Correspondingly, the number of time slots used on the channel can be adjusted e.g. by allowing use of the channel only in every second or every third time frame. This may be done by using e.g. a different channel coding, a more powerful speech codec for a speech connection or a slower data rate for a data connection.

Nor is it essential for the invention how the safety area definition algorithm is implemented. The safety area may be defined e.g. administratively through the network management system NMS or with some adaptive algorithm, e.g. in the base station controller. The base transceiver stations subordinated to the same base station controller as the base transceiver station may e.g. be defined as the safety area. Suitable adaptive methods are e.g. methods based on definition of signal drop-outs or on measurement of the strength of interfering signals caused by nearby base transceiver stations or by studying channel exchanges performed in the network. The safety area may also be defined as e.g. n-neighbours of the base transceiver station's cell. The cell's n-neighbours are those other cells to which there is access from the cell only through n successive channel exchanges (between the cells).

If the limitation is active only for a relatively short period, safety areas may be defined slightly bigger than the required area. An exact analysis of interference between channels is not hereby necessarily required, as is the case with methods based on a knowledge of the allocation situation. However, limitation of allocation over a slightly too wide area will lower the network's capacity only for a short time. When the results of interference measurements can again be considered reliable after a certain delay, the limitation is discontinued and a state-of-the-art allocation procedure based on measured interference values is essentially resumed.

Safety areas may be defined separately for interference of the same channel, that is, for mutual interference of connections using the same channel, and for adjacent channel interference, that is, for mutual interference of connections using adjacent channels. The same safety area may of course also be defined both for same channel interference and for adjacent channel interference.

Figure 1:
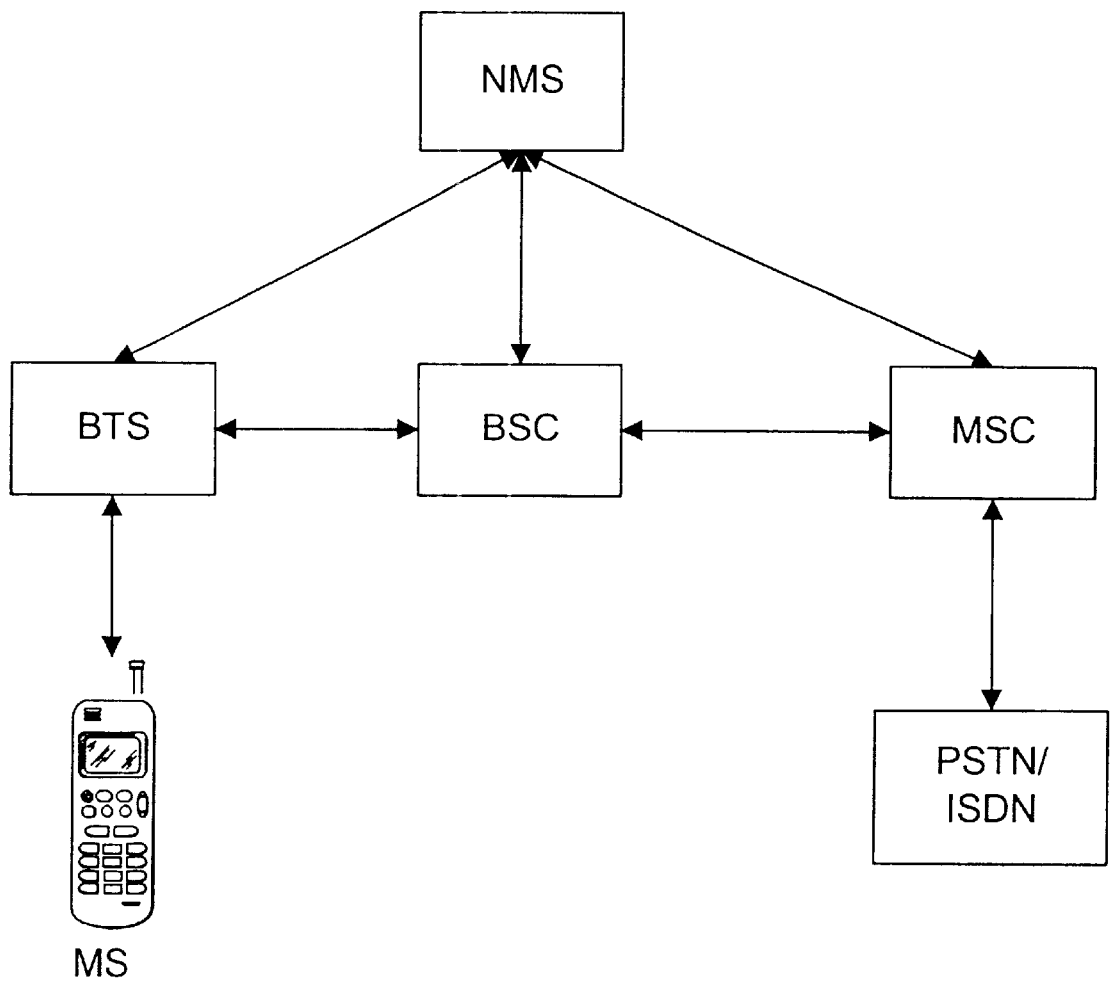
FIG. 1 shows the structure of a known mobile communications system.
Figure 2:
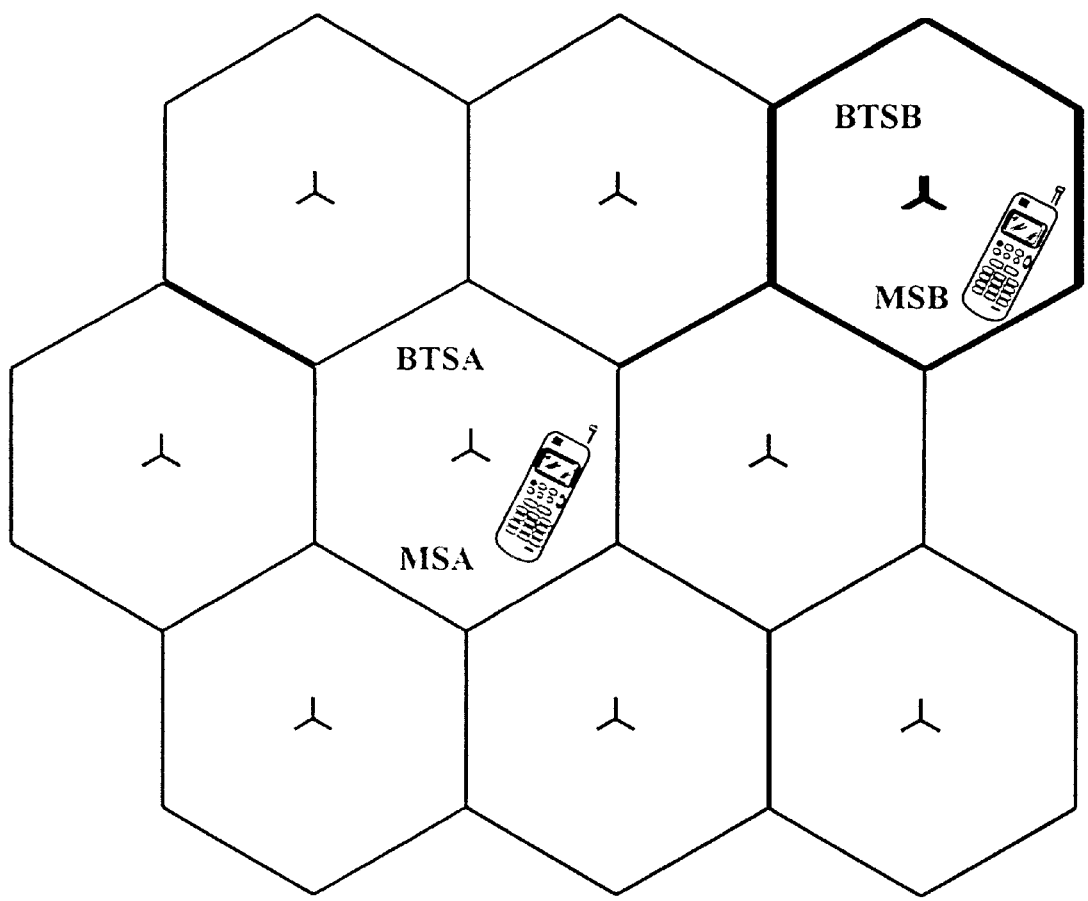
FIG. 2 shows a situation where two mobile stations are requesting a channel of adjacent base transceiver stations.

It is not essential for the invention where the channel allocation method is performed in the network shown in FIG. 1. It is not necessary to perform the method in base transceiver station BTS as in the example presented above, but it may also be performed e.g. in a decentralized manner in mobile station MS and in the base transceiver station so that the base transceiver station selects the up-link channel while the mobile station selects the down-link channel. The mobile station will hereby report which down-link channel it has selected to the base transceiver station which will check if allocation of the chosen channel has been temporarily limited.

A third example of a possible place for performing channel allocation is the base station controller. If the algorithm is placed in the base station controller and all base transceiver stations of the safety area are subordinated to the same base station controller, then allocation reports need not (actually) be signaled, but the limitation register is preserved and maintained in the base station controller. If the safety area comprises base transceiver stations subordinated to several base station controllers, then the allocation report must be signaled to all those base station controllers to which base transceiver stations belonging to the concerned safety area are subordinated. Allocation may also be done in a decentralized manner in the base station controller and in the mobile station. As above, the mobile station hereby selects the down-link channel while the base station controller selects the up-link channel. The mobile station reports which down-link channel it has chosen to the base station controller, which checks if allocation of the chosen channel has been temporarily limited.

The signalling informing on new allocations between base transceiver stations is preferably as quick as possible. This will minimize the probability of the channel being allocated for a second base transceiver station until information is received by signalling on any recent allocation of the same channel for a first base transceiver station. E.g. just the number of the allocated channel is sufficient transferable information. E.g. with 6 bits it is possible to express 64 channels, so signalling can be carried out quite quickly. Besides, received messages need not necessarily be acknowledged, if the limitation is valid for only a short period at a time. Any falsely interpreted allocation report will not hereby cause false functions over a long time, but it will affect the function in an undesirable manner only for the time of a rather short safety period, which is typically a few seconds.

As is obvious, embodiments of the invention are not limited to the embodiment described herein as an example, but they may vary in accordance with the scope of the appended claims.

What is claimed is:

1. Method of channel allocation in a mobile communications network comprising at least base transceiver stations and mobile stations and wherein connections between the base transceiver station and mobile stations are set up over the radio path, in which network the method comprising:

defining for each base transceiver station a predetermined safety area which comprises a set of cell areas of other base transceiver stations surrounding the base transceiver station in which introduction of channels for other connections between base transceiver stations in the safety area and mobile stations within their cell areas could cause mutual interference between previous connections of the base transceiver station and the other connections, measuring channel interference levels, averaging the measurements of the channel interference levels, allocating a channel K for usage as a first connection between a mobile station and a base transceiver station based on the channel interference levels, introducing said channel K, and after introduction of channel K temporarily limiting introduction of channels for the other connections between base transceiver stations in the safety area and mobile stations in the safety area, if introduction of the other channel would cause mutual interference between the first connection and the other connections.

2. Method as defined in claim 1, wherein the limitation is performed for a predetermined safety period after channel K has been allocated for use as the first connection.

3. Method as defined in claim 2, wherein the safety period is considered to be of a length essentially equal to a delay caused by the averaging of the measurements of the channel interference levels.

4. Method as defined in claim 2, wherein the safety period is defined for each base transceiver station.

5. Method as defined in claim 2, wherein the safety period is reported by a signalling message to the network elements in charge of allocation of channels of cell areas belonging to the safety area.

6. Method as defined in claim 2, wherein the safety period is defined for each mobile station.

7. Method as defined in claim 1, wherein the limitation is carried out by preventing channel allocation entirely.

8. Method as defined in claim 1, wherein the limitation is carried out by limiting the maximum transmission power allowed on the channel.

9. Method as defined in claim 1, wherein the limitation is carried out by limiting the number of time slots used on the channel.

10. Method as defined in claim 1, wherein allocation of a channel K allocated for a connection is limited for those other base transceiver stations from which use of the same channel K might cause mutual same channel interference with the connection.

11. Method as defined in claim 1, wherein allocation of channels adjacent to a channel K allocated for a connection is limited for those other base transceiver stations from which use of the concerned adjacent channels might cause mutual adjacent channel interference with the connection.

12. Method as defined in claim 10, wherein allocation of channel K allocated for use by a connection and of its adjacent channels is limited for all base transceiver stations of the safety area in the same manner.

13. Method as defined in claim 10, wherein allocation of a channel allocated for use by a connection and of its adjacent channels is limited in different ways for different base transceiver stations.

14. Method as defined in claim 1, wherein the safety areas of base transceiver stations are defined administratively from a network management system.

15. Method as defined in claim 1, wherein the safety areas of base transceiver stations are defined based on a measurement of signal drop-out of channels used at other base transceiver stations.

16. Method as defined in claim 1, wherein the safety areas of base transceiver stations are defined based on a measurement of carrier to interference ratio caused by channels used at other base transceiver stations.

17. Method as defined in claim 1, wherein an area defined by cell areas of base transceiver stations located subordinated to the same base station controller is defined as safety areas for the base transceiver stations.

18. Method as defined in claim 1, wherein the cell area of those cells is defined as safety areas for base transceiver stations to which access is possible from the cell of the base transceiver station only through a predetermined number of channel exchanges.

19. Method as defined in claim 1, wherein channel allocation is performed in the base station controller.

20. Method as defined in claim 1, wherein channel allocation is performed at the base transceiver station.

21. Method as defined in claim 1, wherein channel allocation is performed in a decentralised manner in the mobile station and at the base transceiver station.

* * * * *